United States Patent
Otsubo et al.

(10) Patent No.: US 12,454,292 B2
(45) Date of Patent: Oct. 28, 2025

(54) RUBBER BUSHING FOR RAILROAD TRUCKS

(71) Applicant: Sumitomo Riko Company Limited, Aichi (JP)

(72) Inventors: Shigehiro Otsubo, Aichi (JP); Satoru Ogawa, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 626 days.

(21) Appl. No.: 17/939,934

(22) Filed: Sep. 7, 2022

(65) Prior Publication Data
US 2023/0001964 A1 Jan. 5, 2023

Related U.S. Application Data

(63) Continuation of application No. PCT/JP2021/017847, filed on May 11, 2021.

(30) Foreign Application Priority Data

May 29, 2020 (JP) .................................. 2020-094551

(51) Int. Cl.
*B61F 15/02* (2006.01)
*B61F 5/30* (2006.01)
(Continued)

(52) U.S. Cl.
CPC ............... *B61F 15/02* (2013.01); *B61F 5/30* (2013.01); *B61F 5/36* (2013.01); *B61F 15/04* (2013.01);
(Continued)

(58) Field of Classification Search
CPC .......... B61F 15/02; B61F 15/04; B61F 15/26; B61F 5/30; B61F 5/36; F16F 2230/10; F16F 1/38
(Continued)

(56) References Cited

U.S. PATENT DOCUMENTS 2,621,949 A * 12/1952 Grantham ................. F16F 1/38
403/228
5,165,803 A 11/1992 Zivkovic
(Continued)

FOREIGN PATENT DOCUMENTS

DE 102008045158 5/2009
DE 102008045158 A1 * 5/2009 ................ F16F 1/38
(Continued)

OTHER PUBLICATIONS

"International Search Report (Form PCT/ISA/210) of PCT/JP2021/017847," mailed on Jun. 22, 2021, with English translation thereof, pp. 1-4.
(Continued)

*Primary Examiner* — S. Joseph Morano
*Assistant Examiner* — James William Jones
(74) *Attorney, Agent, or Firm* — JCIPRNET (57) ABSTRACT

Achieved is a rubber bushing for railroad trucks which has a novel structure and is capable of improving, for example, flame resistance to externally applied fire or the like without greatly degrading the basic properties demanded with respect to vibrational and load inputs. A rubber bushing 10 used for railroad car trucks comprises a shaft-like inner member 12 and an outer member 14, disposed on the outer peripheral side of the inner member 12 at a remove therefrom, which are linked by a rubber elastic body 16. A cover part 48 that covers an exposed end surface 44, from the outside thereof, where the rubber elastic body 16 is exposed to the outside between the axial ends of the inner member 12 and the outer member 14, is provided at an axial end of the rubber elastic body 16 as a separate member from the rubber elastic body 16.

7 Claims, 6 Drawing Sheets

(51) Int. Cl.
    *B61F 5/36*     (2006.01)
    *B61F 15/04*    (2006.01)
    *B61F 15/26*    (2006.01)
    *F16F 1/38*     (2006.01)

(52) U.S. Cl.
    CPC ............ *B61F 15/26* (2013.01); *F16F 1/38* (2013.01); *F16F 2230/10* (2013.01)

(58) Field of Classification Search
    USPC ...................................................... 105/218.1
    See application file for complete search history.

(56) References Cited

U.S. PATENT DOCUMENTS

| | | | | |
|---|---|---|---|---|
| 5,472,226 | A * | 12/1995 | Bunker | F16F 1/38 280/681 |
| 2017/0166025 | A1* | 6/2017 | Auten | F16F 1/3863 |
| 2017/0355387 | A1* | 12/2017 | Otsubo | F16F 1/3828 |
| 2020/0282784 | A1* | 9/2020 | Zimmerman | F16F 1/3842 |

FOREIGN PATENT DOCUMENTS

| | | |
|---|---|---|
| DE | 102016104497 | 9/2016 |
| DE | 102017222009 | 6/2019 |
| EP | 0351689 | 1/1990 |
| EP | 2003361 | 12/2008 |
| EP | 3498567 | 6/2019 |
| GB | 2105784 | 3/1983 |
| JP | 2002249042 | 9/2002 |
| JP | 2015168397 | 9/2015 |
| JP | 2015168397 A * | 9/2015 |

OTHER PUBLICATIONS

"Office Action of China Counterpart Application", issued on Jun. 1, 2024, with English translation thereof, p. 1-p. 15.

"Search Report of Europe Counterpart Application", issued on Sep. 12, 2023, pp. 1-7.

* cited by examiner

RUBBER BUSHING FOR RAILROAD TRUCKS

CROSS-REFERENCE TO RELATED APPLICATION

The present application is a continuation of PCT/JP2021/017847, filed on May 11, 2021, and is related to and claims priority from Japanese Patent Application No. 2020-094551, filed on May 29, 2020. The entire contents of the aforementioned application are hereby incorporated by reference herein.

TECHNICAL FIELD

The disclosure relates to a rubber bushing for railroad trucks used in a truck of a railroad vehicle.

RELATED ART

In the truck of a railroad vehicle, conventionally, a rubber bushing has been adopted as one of the cushioning means at the connecting portion between the structural members in an axle box support device and a vehicle body support device. The axle box support device connects a wheel set (a member that connects a wheel and an axle) and a truck frame via a cushioning means, and for example, there are a monolink type axle box support device in which the truck frame and the wheel set are connected by a single link (monolink), and an axle beam type axle box support device in which the tip of an axle beam extending from an axle box and integrated with the axle box is connected to a truck frame. The vehicle body support device connects a truck frame to a vehicle body via a cushioning means, and for example, there is a towing device in which a towing frame on the vehicle body side and a truck frame are connected by a towing link in a bolsterless truck.

The truck for railroad vehicle is a traveling device that travels and supports the load of the railroad vehicle body, and is used in a state of being exposed below the railroad vehicle body. Therefore, it is conceivable that when an external fire occurs, for example, flames and heat may be directly applied to the truck from below or from a lateral side.

However, in the truck for railroad vehicle, not only the truck frame but also the wheels, support shafts, axle boxes, brake devices, etc., particularly most of the members constituting the lower part of the truck, are made of metal. Therefore, it was considered that most of the members are not subject to the risk brought by external flames and high heat.

However, as shown in Patent Literature 1 (Japanese Patent Laid-Open No. 2015-168397), in recent years, besides a coil spring, a rubber bushing is often adopted as the cushioning means between the wheel set and the truck frame in the above-mentioned axle box support device. Also in the towing device, as shown in Patent Literature 2 (Japanese Patent Laid-Open No. 2002-249042), both ends of the towing link are connected to the towing frame and the truck frame via the rubber bushing.

Since such a rubber bushing is generally mounted at a position relatively below the truck for railroad vehicle (below the truck frame), there are concerns that the rubber bushing may burn, smoke, or generate toxic gas when caught on flames and high heat from outside the truck.

In view of these problems, it was also considered to use a special rubber bushing with high flame retardancy as the rubber material, but it was difficult to achieve both the vibration-proofing and vibration-damping performance required for rubber bushing, and the basic properties such as load-bearing performance and durability performance.

It was also considered to integrally provide a flame-retardant coating layer as the rubber surface layer of the rubber bushing. However, the coating layer that is fixed or integrally formed on the rubber surface may also hinder the free deformation of the rubber surface. Moreover, since the rubber surface is repeatedly elastically deformed by input in the mounted state, there is also a problem that cracks are likely to occur in the coating layer and it is difficult to stably maintain the desired coating effect for a long period of time.

SUMMARY

The disclosure provides a rubber bushing for railroad truck which has a new structure and is capable of improving the flame retardancy against flames, etc. applied from the outside without significantly impairing the required basic properties.

Aspects for grasping the disclosure will be described hereinafter, but each of the aspects described below is described in an illustrative manner. Not only the aspects can be adopted in combination with each other as appropriate, but also a plurality of components described in each aspect can be recognized and adopted independently where possible and can also be adopted in combination with any component described in another aspect as appropriate. Therefore, in the disclosure, various other aspects can be realized without being limited to the aspects described below.

The first aspect is a rubber bushing for railroad truck used for a truck of a railroad vehicle, in which a shaft-shaped inner side member and an outer side member arranged apart from an outer peripheral side of the inner side member are connected by a rubber elastic body, and at an axial end of the rubber elastic body, a cover part that covers from outside an exposed end surface where the rubber elastic body is exposed to the outside between respective axial ends of the inner side member and the outer side member is provided as a separate member from the rubber elastic body.

In the rubber bushing for railroad truck (may be simply referred to as rubber bushing hereinafter) of the present aspect, the exposed end surface of the rubber elastic body is covered by the cover part that is composed of a separate member from the rubber elastic body. Therefore, even if flames are spread from the outside to the truck for railroad vehicle (may be simply referred to as truck hereinafter) mounted with the rubber bushing, direct exposure of the exposed surface of the rubber elastic body to the flames can be reduced or prevented. Moreover, since the cover part is provided as a separate member, the degree of freedom in selecting the material of the rubber elastic body is not limited, and it is also possible to prevent the properties of the rubber elastic body itself from being significantly impaired by the cover part.

According to the second aspect, in the rubber bushing for railroad truck according to the first aspect, a flange-shaped rubber part having a large diameter is provided at the axial end of the rubber elastic body and the flange-shaped rubber part is sandwiched in an axial direction between the respective axial ends of the inner side member and the outer side member, and an outer peripheral surface of the flange-shaped rubber part is taken as the exposed end surface and is covered by the cover part.

The rubber bushing for railroad truck of the present aspect can be suitably adopted as, for example, a rubber bushing mounted on a portion of the tip of the axle beam attached to the truck frame side in the axle beam type axle box support device. Particularly, while it is possible to obtain a large spring constant and large load-bearing performance in the axial direction in the rubber bushing provided with the flange-shaped rubber part as described in the present aspect, the flange-shaped rubber part is exposed toward the outer peripheral surface of the rubber bushing. Therefore, the flame retardancy against flames from below the truck tends to become a problem. For such a problem, in the present aspect, the exposed surface of the flange-shaped rubber part directed toward the outer peripheral surface is covered, which makes it possible to reduce the risk of external flames while securing the basic spring properties.

According to the third aspect, in the rubber bushing for railroad truck according to the first aspect, the axial end of the rubber elastic body has an axial exposed surface exposed outward in an axial direction between the respective axial ends of the inner side member and the outer side member, and the axial exposed surface is taken as the exposed end surface and is covered by the cover part.

The rubber bushing for railroad truck of the present aspect can be suitably adopted as, for example, a rubber bushing mounted on a portion of the monolink attached to the truck frame side or the wheel set side in the monolink type axle box support device. Particularly, while it is possible to set a large spring ratio between the axial perpendicular direction and the axial direction in the rubber bushing as described in the present aspect, the axial end of the rubber bushing is exposed outward in the axial direction with a relatively large area. Therefore, the flame retardancy against flames from the lateral side of the truck tends to become a problem. For such a problem, in the present aspect, the exposed surface of the rubber elastic body directed outward in the axial direction is covered, which makes it possible to reduce the risk of external flames while securing the basic spring properties.

According to the fourth aspect, in the rubber bushing for railroad truck according to any one of the first to third aspects, a gap is provided between the exposed end surface of the rubber elastic body and the cover part.

In the rubber bushing for railroad truck of the present aspect, the gap provided between the exposed end surface of the rubber elastic body and the cover part can reduce or prevent the deformation constraint of the cover part on the free surface of the rubber elastic body. In addition, the air layer in the gap makes it possible to suppress heat transfer from the cover part to the rubber elastic body. In addition, it is also possible to reduce or prevent wear and damage due to contact between the exposed end surface which is elastically deformed and the cover part. It is not necessary to provide a gap over the entire area between the exposed end surface of the rubber elastic body and the cover part.

According to the fifth aspect, in the rubber bushing for railroad truck according to any one of the first to fourth aspects, the cover part is in contact with the exposed end surface of the rubber elastic body in at least a part.

In the rubber bushing for railroad truck of the present aspect, the exposed end surface of the rubber elastic body and the cover part are in contact with each other, which makes it easy to maintain the exposed end surface covered with the cover part. Further, by bringing the cover part into contact with the rubber elastic body, it is easy to position the cover part in the mounted state. In addition, by bringing the cover part into close contact with the exposed end surface, the supply of air is blocked at least at the contact portion, which makes it easy to suppress combustion of the rubber elastic body.

According to the sixth aspect, in the rubber bushing for railroad truck according to any one of the first to fifth aspects, at least a part of the cover part is made of an elastomer.

In the rubber bushing for railroad truck of the present aspect, based on the deformable properties of the elastomer, for example, even if the cover part comes into contact with the exposed end surface, the deformation constraining force on the rubber elastic body can be reduced to satisfactorily secure the properties of the rubber elastic body. Further, as in the seventh aspect described later, for example, it is possible to easily keep the cover part in the mounted state and position the cover part by utilizing the elastic properties of the elastomer. Moreover, because of the deformable properties of the elastomer, it is possible to reduce or prevent damage to the members, for example, when the cover part comes into contact with the exposed end surface.

According to the seventh aspect, in the rubber bushing for railroad truck according to the sixth aspect, the cover part is positioned at a position to cover the exposed end surface of the rubber elastic body from outside by utilizing elasticity of the elastomer.

In the rubber bushing for railroad truck of the present aspect, it is possible to simplify the mounting structure of the cover part and improve the stability of the mounted state by skillfully utilizing the properties of the elastomer that constitutes the cover part.

According to the eighth aspect, in the rubber bushing for railroad truck according to any one of the first to seventh aspects, in a state of being mounted on the truck of the railroad vehicle, the exposed end surface of the rubber elastic body is covered by the cover part in a state where the exposed end surface is not directly visible from outside from any direction.

In the rubber bushing for railroad truck of the present aspect, it is possible to impart to the rubber elastic body effective resistance against flames or heat spread not only from a specific direction but also from various directions. Therefore, it is possible to secure flame retardancy in unexpected situations, and it is possible to easily respond while maintaining the flame retardancy even when the mounted state, orientation, position, etc. are changed.

According to the disclosure, a rubber bushing for railroad truck can be realized, which has a new structure and is capable of improving the flame retardancy against flames, etc. applied from the outside without significantly impairing the basic properties required for input vibration and load.

BRIEF DESCRIPTION OF DRAWINGS

(a) and (b) of FIG. 6 are single-item views showing the axial external views of the cover ring constituting the rubber bushing for axle box support device shown in FIG. 1, and (b) is a cross-sectional view taken along the line VI-VI of (a).

(a) and (b) of FIG. 11 are single-item views showing the axial internal views of the covering cover constituting the rubber bushing for axle box support device shown in FIG. 8, and (b) is a cross-sectional view taken along the line XI-XI of (a).

DESCRIPTION OF EMBODIMENTS

Hereinafter, embodiments schematically showing aspects of the implementation level to which the disclosure is applied will be described with reference to the drawings.

FIG. 1 to FIG. 6 show a rubber bushing 10 for axle beam to be mounted on a portion of the axle beam attached to a truck for railroad vehicle, as the first embodiment of a rubber bushing for axle box support device which is a rubber bushing for railroad truck having a structure according to the disclosure.

Figure 1:
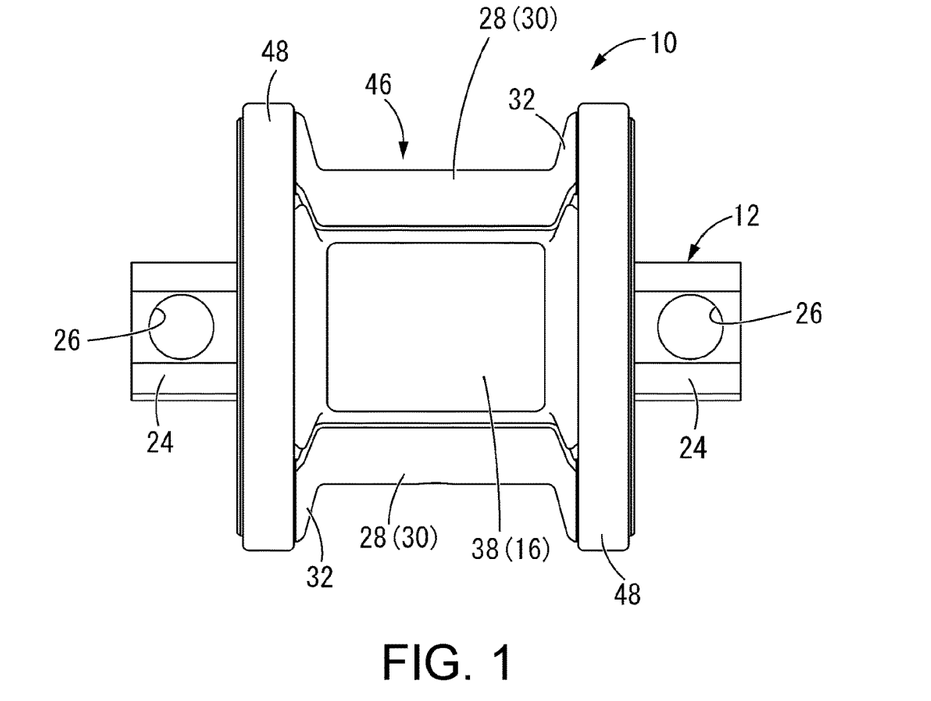
FIG. 1 is a front view showing the rubber bushing for axle box support device as the first embodiment of the disclosure.
Figure 2:
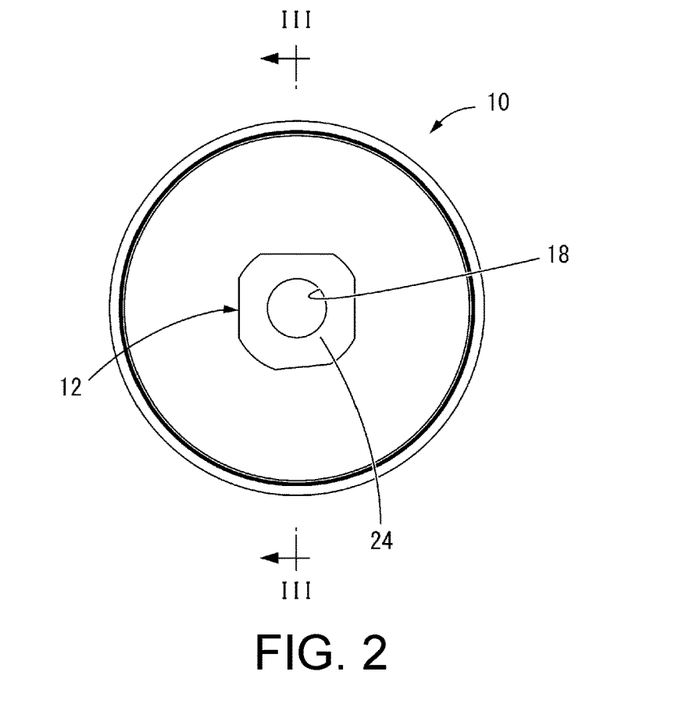
FIG. 2 is a left side view of FIG. 1.
Figure 3:
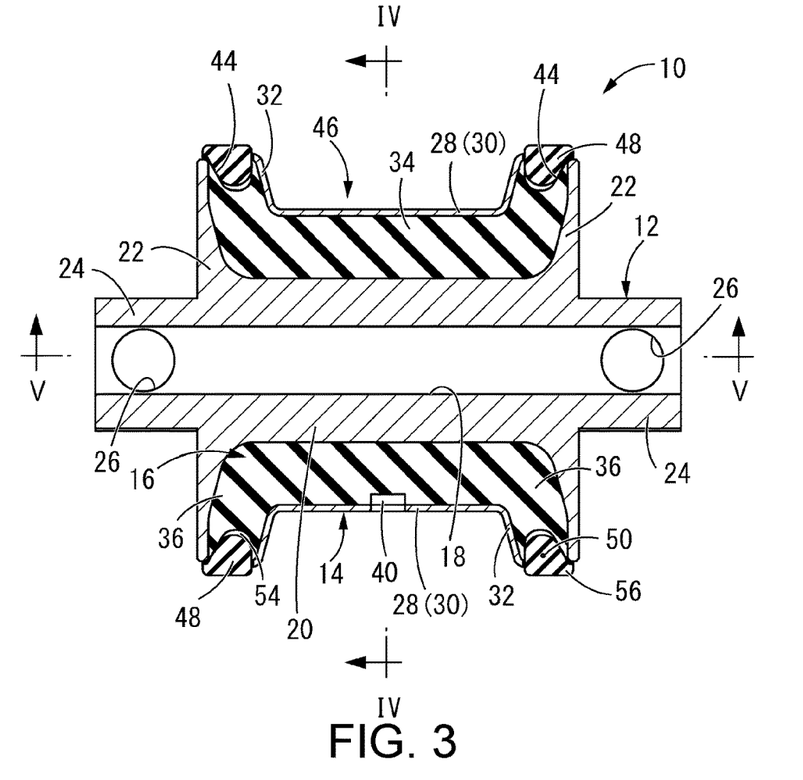
FIG. 3 is a cross-sectional view taken along the line III-III of FIG. 2.

The rubber bushing 10 for axle beam of the present embodiment has a substantially cylindrical bushing structure as a whole, and includes an inner member 12 as the inner side member and an outer member 14 as the outer side member arranged apart from the outer periphery of the inner member 12, and further the inner member 12 and the outer member 14 are elastically connected by a rubber elastic body 16. In the following description, an axial direction refers to a central axial direction of the rubber bushing 10 and the inner member 12, and an axial perpendicular direction refers to a direction orthogonal to the central axis of the rubber bushing 10 and the inner member 12.

More specifically, the inner member 12 is a highly rigid member made of metal such as iron or an aluminum alloy, and has a hollow or solid rod shape that extends linearly. In the present embodiment, the inner member 12 has a hollow substantially cylindrical shape provided with a center hole 18 that penetrates in the axial direction.

The central portion of the inner member 12 in the axial direction is a central rod part 20 that extends in a constant cylindrical shape. A pair of inner flange-shaped parts 22 protruding in a flange shape toward the outer periphery are integrally formed at both axial ends of the central rod part 20.

The axial outer surface of the inner flange-shaped part 22 is a flat surface that expands in the axial perpendicular direction while the axial inner surface is an inclined surface that rises smoothly so that the inclination angle gradually increases from the outer peripheral surface of the cylinder of the central rod part 20 outward in the axial direction. As a result, in the inner peripheral portion of the inner flange-shaped part 22, the axial thickness dimension gradually changes to be smaller toward the outer periphery.

Further, both end portions of the inner member 12 in the axial direction are inner shaft ends 24 having a substantially polygonal outer peripheral surface shape and protruding outward in the axial direction. Through holes 26 for attaching are formed in the inner shaft ends 24 to penetrate in the axial perpendicular direction.

In contrast, the above-mentioned outer member 14 is composed of a pair of outer split bodies 28. Each outer split body 28 has a central plate-shaped part 30 that has an arcuate curved plate shape extending in the circumferential direction with a length less than half a circumference (about ¼ circumference in the present embodiment). Further, outer flange-shaped parts 32 whose diameter expands outward in the axial direction as if the outer flange-shaped parts 32 are bent toward the outer peripheral side are integrally formed at both axial ends of the central plate-shaped part 30. The outer split body 28 constituting the outer member 14 of the present embodiment can be manufactured by, for example, pressing a metal plate.

Then, the pair of outer split bodies 28 are arranged to be separated from each other on the outer peripheral side of the central rod part 20 of the inner member 12, sandwich the inner member 12 in one axial perpendicular direction, and face each other. Under such an arrangement state, the central rod part 20 of the inner member 12 and the central plate-shaped parts 30 of the outer split bodies 28 face each other in the axial perpendicular direction with a substantially constant distance between the facing surfaces, the inner flange-shaped parts 22 of the inner member 12 and the outer flange-shaped parts 32 of the outer split bodies 28 face each other in an axial inclination direction with a substantially constant distance between the facing surfaces. However, the shapes and dimensions of the inner member 12, the outer split bodies 28, and the rubber elastic body 16 are appropriately set according to the required properties and are not limited. For example, the thickness of a flange-shaped rubber part 36, which will be described later, may be tapered between the facing surfaces of the inner flange-shaped part 22 and the outer flange-shaped part 32, the inclination angle of the flange-shaped rubber part 36 may be changed and set, the circumferential length of the outer split body 28 may be changed and set, and the axial length of the outer split body 28 and the rubber elastic body 16 may be changed and set, making it possible to appropriately meet the required properties.

Furthermore, the above-mentioned rubber elastic body 16 has a substantially cylindrical shape with a thick wall as a whole. The central portion in the axial direction is a central tubular part 34 that has a straight cylindrical shape. Both side portions in the axial direction are the flange-shaped rubber parts 36 that expand from both sides of the central tubular part 34 in the axial direction toward the outer peripheral side. The central tubular part 34 and the pair of flange-shaped rubber parts 36 are continuous with a substantially constant thickness dimension. As described above, the thickness dimension and the inclination angle of the flange-shaped rubber part 36 can be appropriately changed in design and the central tubular part 34 and the flange-shaped rubber parts 36 can be separate members, and for example, the central tubular part 34 and the flange-shaped rubber parts 36 can be set to have different materials. In the inner member 12 and the outer member 14, the inner flange-shaped part 22 and the outer flange-shaped part 32 can be assembled as separate members.

Then, the central tubular part 34 is arranged on the outer peripheral surface of the central rod part 20 of the inner member 12, and the flange-shaped rubber parts 36 are arranged on the axial inner surfaces of the inner flange-shaped parts 22 of the inner member 12. That is, the rubber elastic body 16 is fixed to the outer peripheral surface of the inner member 12 so as to continuously cover substantially the entire surface from the outer peripheral surface of the central rod part 20 of the inner member 12 to the axial inner surfaces of the inner flange-shaped parts 22. The inner member 12 that covers the inner peripheral surface of the rubber elastic body 16 does not need to be continuous on the entire surface. For example, as described above, when the central tubular part 34 and the flange-shaped rubber parts 36 of the rubber elastic body 16 are separate members, the surfaces to be fixed to the inner member 12 may be separated. For example, when a hollow portion (such as a recess part) is partially provided in the rubber elastic body for the purpose of adjusting the spring properties, an inner peripheral surface not covered by the inner member 12 may be present on the rubber elastic body 16.

Figure 4:
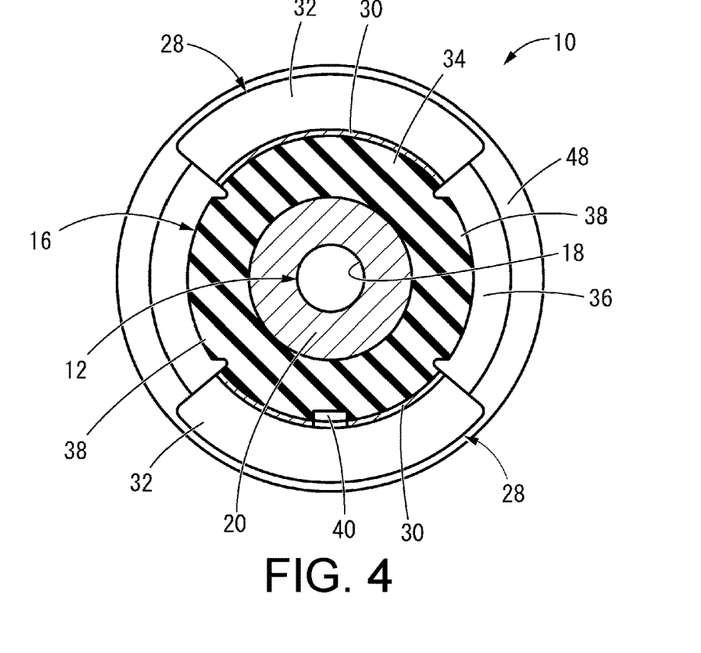
FIG. 4 is a cross-sectional view taken along the line IV-IV of FIG. 3.
Figure 5:
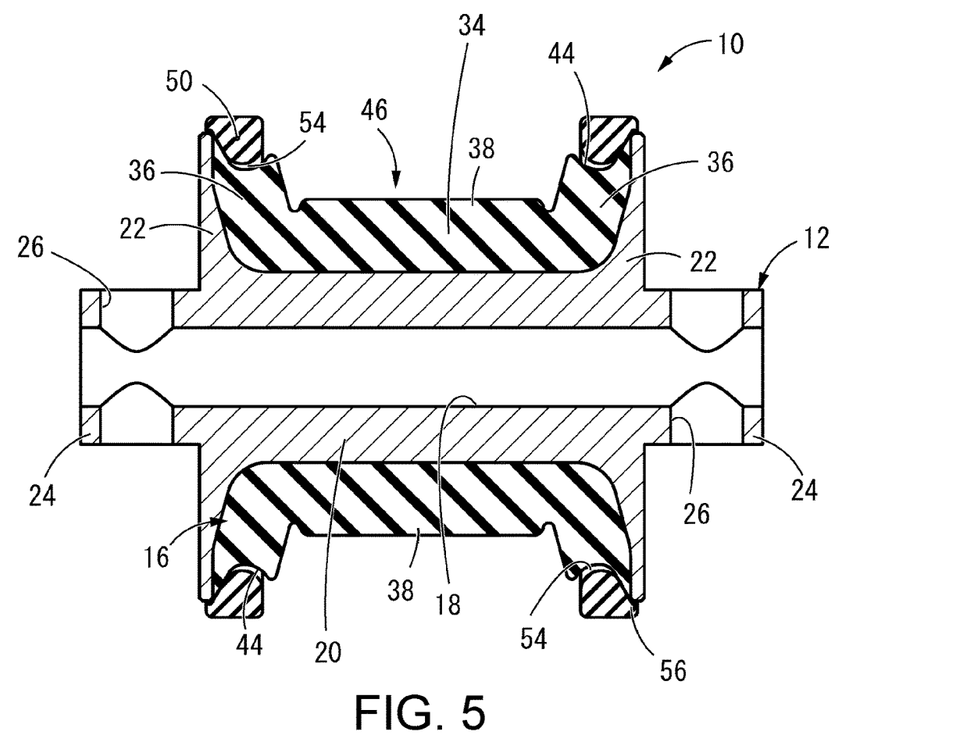
FIG. 5 is a cross-sectional view taken along the line V-V of FIG. 3.

In addition, the pair of outer split bodies 28 are overlapped on the outer peripheral surface of the rubber elastic body 16 at portions facing each other in one radial direction (vertical direction in FIG. 3 and FIG. 4). In each outer split body 28, the central plate-shaped part 30 is overlapped on the outer peripheral surface of the central tubular part 34, and the outer flange-shaped parts 32 are overlapped on the axial inner surfaces of the flange-shaped rubber parts 36. That is, the pair of outer split bodies 28 are fixed to the outer peripheral surface of the rubber elastic body 16 so as to closely cover the outer peripheral surface of the rubber elastic body 16 at the portions facing each other in one radial direction.

In both side portions in the radial direction (lateral direction in FIG. 4 and vertical direction in FIG. 5) orthogonal to the facing arrangement direction of the pair of outer split bodies 28, the outer peripheral surface of the rubber elastic body 16 is exposed without being covered with the outer member 14. Then, at the exposed portion of the central tubular part 34 of the rubber elastic body 16, a cushioning protrusion part 38 that has a substantially rectangular plateau shape curved in the circumferential direction of the inner member 12 and protrudes outward in the radial direction at a predetermined height is integrally formed. Furthermore, a positioning hole 40 reaching to the rubber elastic body 16 is formed at substantially the center of one of the outer split bodies 28.

Further, the flange-shaped rubber parts 36 provided at both axial ends of the rubber elastic body 16 have an enlarged diameter shape slightly inclined outward in the axial direction. In addition, the outer peripheral surface of the flange-shaped rubber part 36 is an outer peripheral exposed surface 44 that is exposed over the entire circumference without being covered with the inner member 12 or the outer member 14. That is, the outer peripheral exposed surfaces 44 serving as exposed end surfaces exposed outward in the radial direction are formed at both axial ends of the rubber elastic body 16, respectively.

In the present embodiment, the outer peripheral exposed surface 44 of the flange-shaped rubber part 36 has a substantially constant cross-sectional shape composed of a curved concave shape (substantially arcuate shape) that opens on the outer peripheral surface, and has a groove shape extending over the entire circumference in the circumferential direction. As a result, the area of the free surface is secured in the flange-shaped rubber part 36 in which the deformation of the surface is constrained by the inner flange-shaped part 22 and the outer flange-shaped part 32, and the tensile stress on the outer peripheral exposed surface 44 when an external force is applied is reduced, and the durability performance and the load-bearing performance are improved accordingly.

As described above, the rubber bushing 10 for axle beam of the present embodiment has a bushing body 46 configured by elastically connecting the inner member 12 and the outer member 14 by the rubber elastic body 16. As described above, the bushing body 46 can be configured as an integrally vulcanized molded product in which the inner member 12 and the outer member 14 are vulcanized and bonded, for example, when the rubber elastic body 16 is vulcanized and molded.

Further, cover rings 48 serving as a cover part separately prepared as a separate member are mounted on the bushing body 46.

Figure 6:
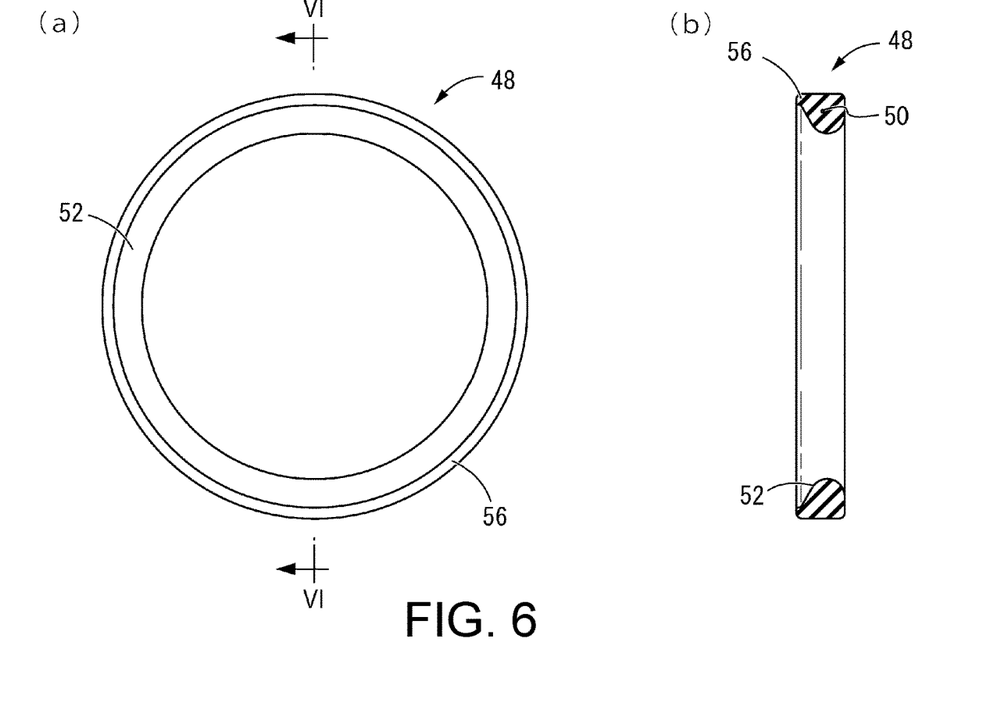

As shown in (a) and (b) of FIG. 6, the cover ring 48 has a circular ring shape as a whole. The shape of the outer peripheral side of the cover ring 48 is not particularly limited, but is, for example, a simple cylindrical shape as shown in the figure. The shape of the inner peripheral side of the cover ring 48 has a substantially arcuate cross-sectional shape that is convex toward the inner peripheral side, substantially corresponding to the shape of the outer peripheral exposed surface 44 formed on the bushing body 46.

In the present embodiment, the cross-sectional shape of the cover ring 48 is also substantially constant over the entire circumference corresponding to that the outer peripheral exposed surface 44 of the bushing body 46 has a substantially constant cross-sectional shape over the entire circumference.

Moreover, the cover ring 48 is made of a flame-retardant rubber elastic body or an elastic material (elastomer) such as silicone. In the single item state, the minimum inner diameter of the cover ring 48 is smaller than the outer diameter of both axial side walls of the groove-shaped outer peripheral exposed surface 44 formed on the bushing body 46.

As the elastic material used in the cover ring 48, any known flame-retardant elastic material can be used in consideration of the required degree of flame retardancy and conditions. Preferably, a material satisfying, for example, the European flame retardant standard of EN45545-2 is adopted. Further, the cover ring 48 is a separate member from the bushing body 46 and the material thereof does not directly affect the basic properties of the rubber elastic body 16, and it is unlikely for the cover ring 48 to be deformed as much as the rubber elastic body 16 due to the input load. Therefore, by adopting chlorosulphonized polyethylene (CSM) and ethylene propylene diene rubber (EPDM) with flame-retardant formulation, for example, the flame retardancy required for the material of the cover ring 48 can be achieved. Besides, by providing a flame-retardant coating layer on the surface of the cover ring 48, for example, the required flame retardancy can also be achieved.

The elastic cover ring 48 is assembled to the outer peripheral exposed surface 44 of the bushing body 46 in a state where the cover ring 48 is expanded in diameter and deformed by elasticity, so that the inner peripheral portion of the cover ring 48 is fitted into the groove shape of the outer peripheral exposed surface 44, and the cover ring 48 can be assembled in a state of being prevented from coming out in the axial direction.

Particularly, in the present embodiment, a center point 50 of the cover ring 48 in the radial direction is located on the inner peripheral side with respect to the outer diameters of the inner flange-shaped part 22 and the outer flange-shaped part 32 constituting both axial side walls of the groove-shaped outer peripheral exposed surface 44, and the cover ring 48 is deeply fitted into the groove-shaped part of the outer peripheral exposed surface 44. Further, in the present embodiment, in the cross section of the groove-shaped outer peripheral exposed surface 44 shown in FIG. 3, the cover ring 48 is assembled in a state of being fitted to half or more of the groove depth direction inward in the radial direction from the opening between the inner flange-shaped part 22 and the outer flange-shaped part 32.

The inner peripheral surface of the cover ring 48 may be in contact with the groove-shaped outer peripheral exposed surface 44 of the rubber elastic body 16 over the entire surface, but in the present embodiment, as shown in FIG. 3, a gap 54 is set between the cover ring 48 and the groove-shaped outer peripheral exposed surface 44 at the bottom thereof. In the cross section of FIG. 3, in the opening of the outer peripheral exposed surface 44 located between the inner flange-shaped part 22 and the outer flange-shaped part 32 in the axial direction, both axial ends of the cover ring 48 are in contact with the inner flange-shaped part 22 and the outer flange-shaped part 32, and the gap 54 disappears. In contrast, in the cross section of FIG. 5, on the inner side of the outer peripheral exposed surface 44 in the axial direction, the gap 54 is opened with respect to the outer peripheral surface (axial inner surface of the flange-shaped rubber part 36) of the rubber elastic body 16 which is a free surface without the outer member 14 (outer split bodies 28) being fixed.

Since the bottom of the groove-shaped outer peripheral exposed surface 44 is not in contact with the cover ring 48, for example, it is possible to improve the degree of freedom of deformation of the free surface of the rubber elastic body 16, reduce wear and damage caused by sliding contact during deformation, and reduce variations in the mounted state of the cover ring 48 due to manufacturing errors. Particularly, in the present embodiment, the gap 54 between the bottom of the outer peripheral exposed surface 44 and the cover ring 48 is continuously set over the entire circumference in the circumferential direction. However, the gap 54 may be partially set in the circumferential direction, or the gap 54 may be set between the cover ring 48 and the outer peripheral exposed surface 44 over the entire surface of the outer peripheral exposed surface 44.

Further, the axial thickness dimension of the inner peripheral portion of the cover ring 48 is reduced so as to be fitted into the groove-shaped outer peripheral exposed surface 44 from the outer peripheral side, but the axial thickness dimension of the outer peripheral portion of the cover ring 48 is larger than that of the groove-shaped opening of the outer peripheral exposed surface 44. As a result, when the cover ring 48 is mounted on the bushing body 46, the groove-shaped opening of the outer peripheral exposed surface 44 is covered over the entire area by the cover ring 48, and the outer peripheral exposed surface 44 is covered so that the outer peripheral exposed surface 44 is almost visually invisible from the outside in the radial direction.

Particularly, in the present embodiment, the cross-sectional shape of the cover ring 48 is a tapered surface 52 in which one surface in the axial direction is inclined. Then, based on the elasticity of the cover ring 48 in the reduced diameter direction under the mounted state, the tapered surface 52 comes into contact with the inner flange-shaped part 22 so that the other surface in the axial direction is pressed against the outer flange-shaped part 32. As a result, under the mounted state of the cover ring 48, the cover ring 48 is stably positioned in the axial direction on the outer peripheral exposed surface 44 of the bushing body 46.

In addition, in the present embodiment, an engaging part 56 protruding outward in the axial direction is formed at the outer peripheral end of the cover ring 48. Then, under the mounted state on the bushing body 46, the engaging part 56 is engaged with the outer peripheral surface of the inner flange-shaped part 22 made of a rigid material so as to be hooked over the entire circumference. As a result, the stability of the mounted state of the cover ring 48 is further improved, and it is possible to easily confirm whether the cover ring 48 is mounted visually from the outside in the axial direction. It is also possible to adjust the saturation and hue of the cover ring 48 to make the cover ring 48 easier to see in order to facilitate visual confirmation of whether the cover ring 48 is mounted and the mounted state.

The rubber bushing 10 for axle beam of the present embodiment which has the above-mentioned structure is used for an axle beam type axle box support device for connecting a wheel set to a truck frame in a truck for railroad vehicle.

Figure 7:
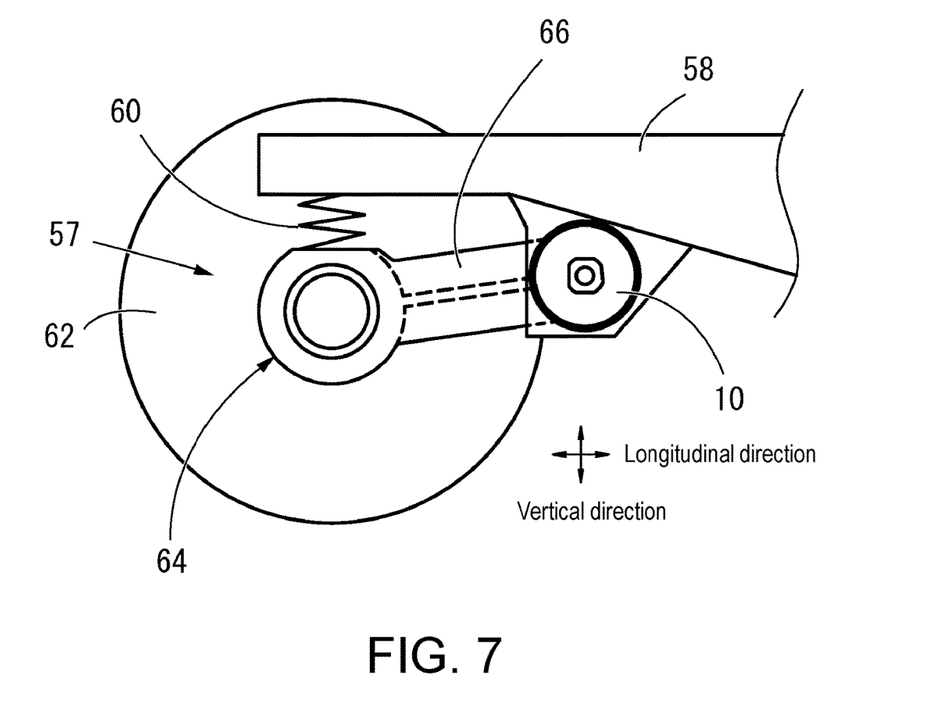
FIG. 7 is an explanatory view showing a state in which the rubber bushing for axle box support device shown in FIG. 1 is mounted on the truck for railroad vehicle.

Specifically, as illustrated as a model in FIG. 7, the axle beam type axle box support device 57 is movably cushioned and supported in the vertical direction of the vehicle by a coil spring 60 with respect to the truck frame 58, the axle box 64 that rotatably supports the axle of the wheel set 62 is integrally provided with an axle beam 66 extending in the longitudinal direction of the vehicle, and the rubber bushing 10 for axle beam of the present embodiment is mounted on a portion of the tip of the axle beam 66 attached to the truck frame 58, so that the axle box 64 is cushioned and supported with respect to the truck frame 58 in the longitudinal direction and the lateral direction of the vehicle. A cylindrical mounting part having a half-split structure is provided at the tip of the axle beam 66, and the cylindrical mounting part is externally fitted and fastened to the outer member 14 of the rubber bushing 10 for axle beam, by which the central shaft of the rubber bushing 10 for axle beam is mounted to extend in the lateral direction of the vehicle. In contrast, the inner shaft ends 24 at both axial ends of the inner member 12 of the rubber bushing 10 for axle beam are inserted into the support holes provided in the truck frame 58 and are fixedly mounted.

Under such a mounted state, the rubber bushing 10 for axle beam is located below the truck frame 58. Then, the inner peripheral surface of the rubber elastic body 16 of the bushing body 46 is covered with the inner member 12, and the outer peripheral surface is covered with the outer member 14 and the cylindrical mounting part having a half-split structure at the tip of the axle beam 66 externally fitted and fixed to the outer member 14. However, the outer peripheral exposed surfaces 44 of the rubber elastic body 16 in the bushing body 46 are exposed on the outer peripheral surface without being covered with the outer member 14 or the cylindrical mounting part of the axle beam 66. The outer peripheral exposed surfaces 44 are in a state of directly facing the road surface in the traveling state of the railroad vehicle.

Here, in the rubber bushing 10 for axle beam of the present embodiment, the outer peripheral exposed surfaces 44 are covered with the cover rings 48 mounted on both side portions of the bushing body 46 in the axial direction. Therefore, for example, even if flames are spread from below or the lateral side, such as the track bed and gauge, to the rubber bushing 10 for axle beam due to an external fire, it is possible to prevent the rubber elastic body 16 from being directly exposed to the flames.

Particularly, since the cover ring 48 is a separate member from the rubber elastic body 16 and can improve the fire resistance performance of the rubber elastic body 16, it is possible to secure a large degree of freedom in design regarding the material and spring properties of the rubber elastic body 16 while improving the fire resistance performance required for the rubber bushing 10 for axle beam with the cover ring 48.

Moreover, in a state where the railroad vehicle truck (truck frame) 58 is mounted on the axle box support device 57 as described above, the inner peripheral surface and the outer peripheral surface of the rubber elastic body 16 are fixedly covered with the inner member 12, the outer member 14, and the cylindrical mounting part at the tip of the axle beam 66, and the outer peripheral exposed surfaces 44 of the rubber elastic body 16 are non-fixedly covered with the cover rings 48. Then, the rubber elastic body 16 as a whole is in a state where the exposed end surface is not directly visible from the outside from any direction. Therefore, the rubber elastic body 16 has excellent defense performance against flames from any direction, and easily complies with conditions such as flame retardant standards.

Further, in the rubber bushing 10 for axle beam of the present embodiment, the cover ring 48 is adopted, in which the cover part is an annular elastic body as a whole and can expand in diameter and deform, and the cover ring 48 is mounted to be fitted into the groove-shaped outer peripheral exposed surface 44 with the diameter expanded. Therefore, when the cover ring 48 is positioned and mounted on the bushing body 46, the mounting work and structure are simple without requiring a special fixing member or fixing means.

Figure 8:
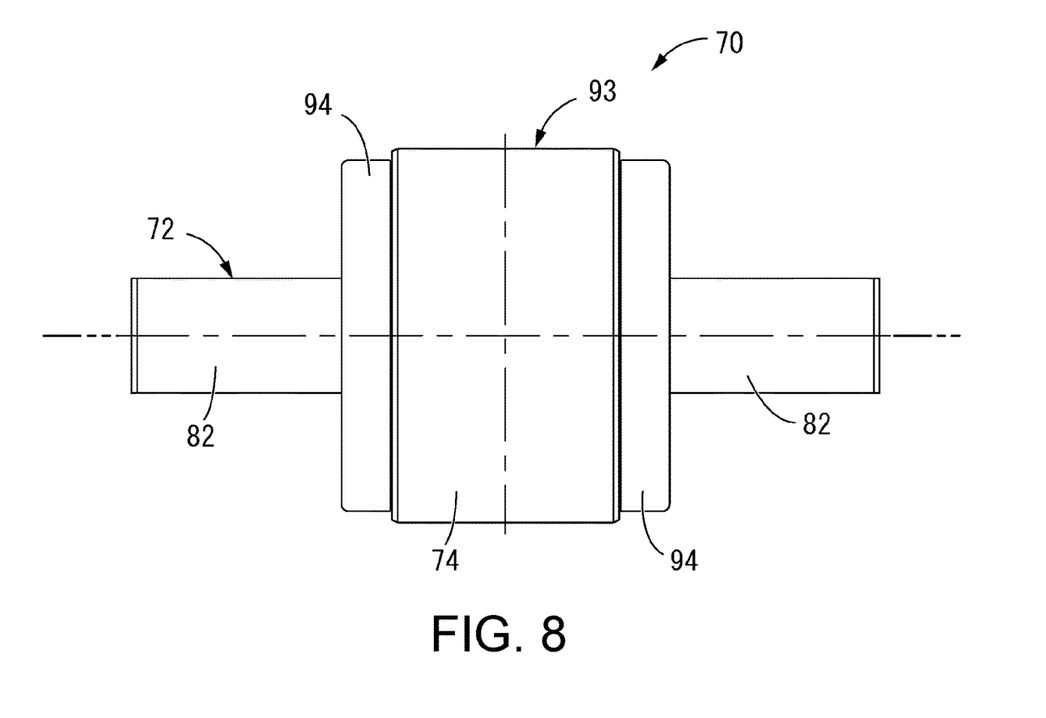
FIG. 8 is a front view showing the rubber bushing for axle box support device as the second embodiment of the disclosure.
Figure 9:
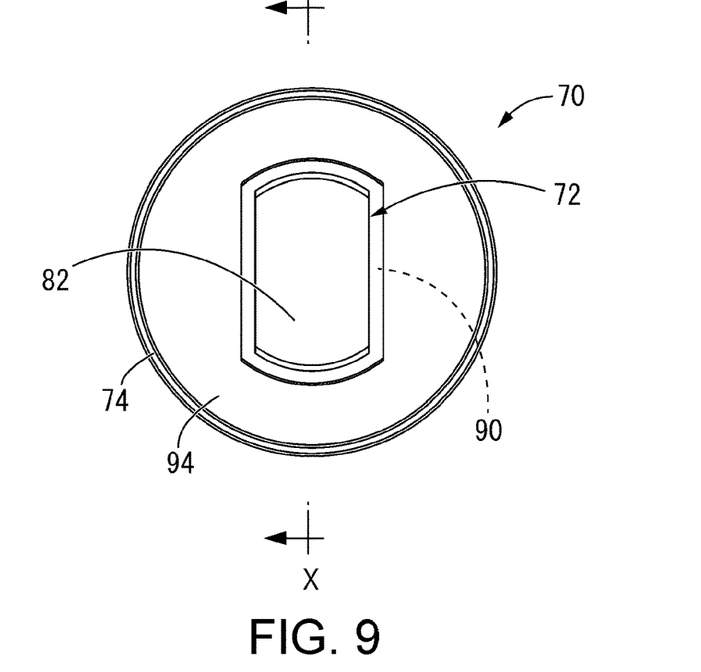
FIG. 9 is a left side view of FIG. 8.
Figure 10:
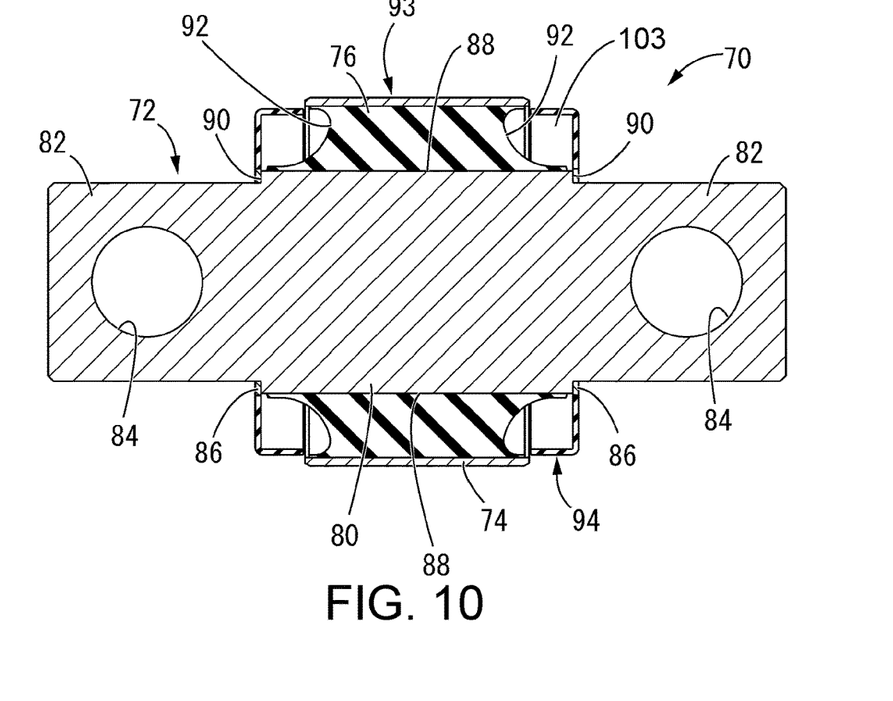
FIG. 10 is a cross-sectional view taken along the line X-X of FIG. 9.

Next, FIG. 8 to FIG. 10 show a rubber bushing 70 for monolink to be mounted on the monolink that connects a wheel set to a truck frame and mounted on a portion of the monolink attached to the wheel set side or the truck frame side, as the second embodiment of a rubber bushing for axle box support device which has a structure according to the disclosure.

The rubber bushing 70 for monolink of the present embodiment has a substantially cylindrical bushing structure as a whole, and includes an inner member 72 as the inner side member and an outer member 74 as the outer side member arranged apart from the outer periphery of the inner member 72, and further the inner member 72 and the outer member 74 are elastically connected by a rubber elastic body 76.

The inner member 72 has a rod shape that extends linearly, and integrally has a central rod part 80 located in the central portion in the axial direction, and a pair of inner shaft ends 82 extending from both axial ends of the central rod part 80 toward both sides in the axial direction.

The central rod part 80 and the inner shaft ends 82 of the inner member 72 both have a cross-sectional shape with a width across flats. That is, a rod having a circular outer peripheral surface is formed into a solid rod shape having an outer peripheral shape that is obtained by partially cutting and chamfering a pair of parallel surfaces (two surfaces) facing each other in the axial perpendicular direction.

The width-across-flat directions of the central rod part 80 and the inner shaft ends 82 on both sides in the axial direction are oriented in the same axial perpendicular direction. Further, each inner shaft end 82 is formed with a through hole 84 located at substantially the center of the chamfered plane and penetrating in the axial perpendicular direction.

In addition, the width-across-flat dimension (the radial outer dimension in which the width across flats faces) and the diameter of the non-chamfered arcuate part of each inner shaft end 82 are both reduced by substantially a constant dimension with respect to the central rod part 80. As a result, irregularly shaped annular steps 86 are formed at both axial ends of the central rod part 80, and are located between the central rod part 80 and the inner shaft ends 82 and extend over the entire circumference.

In contrast, the outer member 74 is composed of a cylindrical metal sleeve. The outer member 74 has a substantially constant thickness dimension as a whole, and the axial length of the outer member 74 is shorter than the central rod part 80 of the inner member 72 on both sides in the axial direction.

Then, the rubber elastic body 76 is arranged between the facing surfaces of the central rod part 80 of the inner member 72 and the outer member 74 in the axial perpendicular direction. The rubber elastic body 76 is fixed to the outer peripheral surface of the central rod part 80 in a close contact state on the inner peripheral surface, and is fixed to the inner peripheral surface of the outer member 74 in a close contact state on the outer peripheral surface.

The rubber elastic body 76 has a substantially thick tubular shape as a whole, and the thickness dimension in the axial perpendicular direction is different in the circumferential direction. That is, on the plane of the arcuate outer peripheral surfaces 88 of the inner member 72, the thickness dimension is substantially constant in the circumferential direction, but on the plane of the width-across-flat outer peripheral surfaces 90 orthogonal thereto, the thickness dimension is large and is changed in the circumferential direction.

Further, both axial end surfaces of the rubber elastic body 76 are axial exposed surfaces 92 serving as the exposed end surfaces. These axial exposed surfaces 92 are free surfaces whose deformation is not constrained by the inner member 72 and the outer member 74. Particularly, in the present embodiment, the axial exposed surface 92 has a groove shape extending in the circumferential direction with a concave arcuate bottom surface that is curved inward in the axial direction.

As described above, the rubber bushing 70 for monolink of the present embodiment has a bushing body 93 that is configured by elastically connecting the inner member 72 and the outer member 74 with the rubber elastic body 76. As described above, the bushing body 93 can be configured as an integrally vulcanized molded product in which the inner member 72 and the outer member 74 are vulcanized and bonded, for example, when the rubber elastic body 76 is vulcanized and molded.

In addition, covering covers 94 serving as the cover parts separately prepared as separate members are mounted on the bushing body 93.

Figure 11:
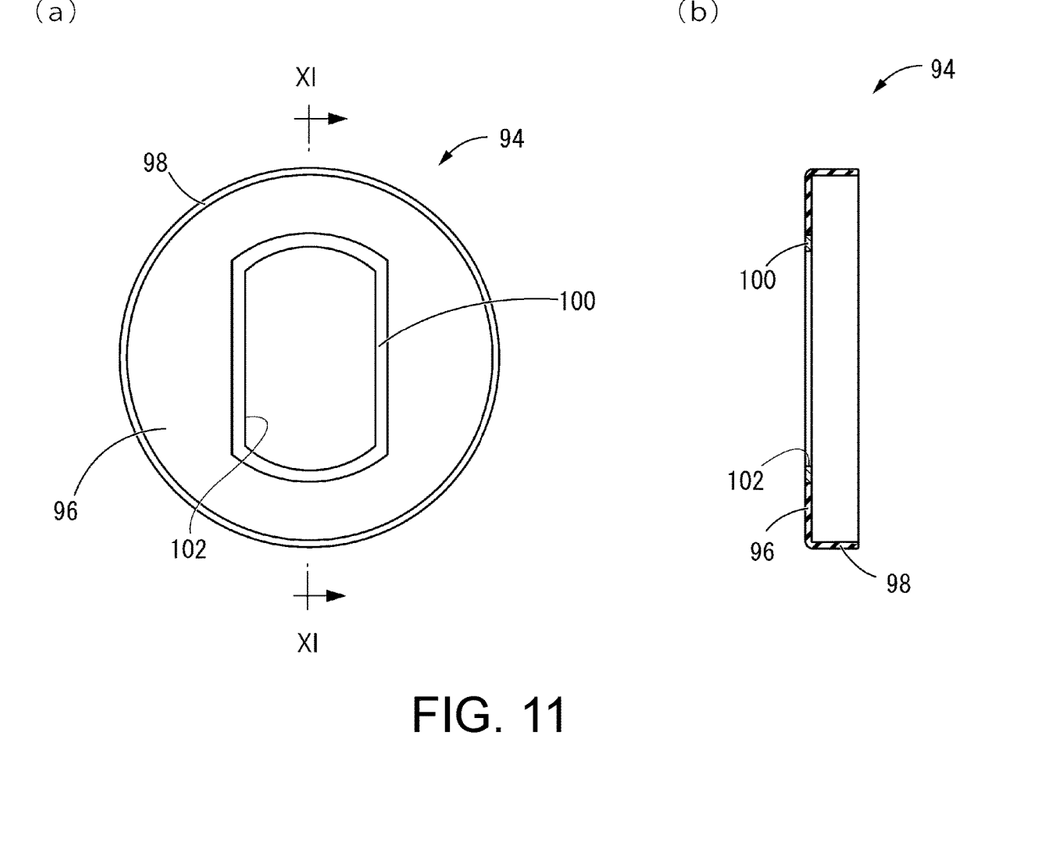

As shown in FIG. 11, the covering cover 94 has a substantially L-shaped cross section and is a thin ring extending in the circumferential direction. Then, the covering cover 94 is made of a flame-retardant rubber elastic body or an elastic material (elastomer) such as silicone, similarly to the cover ring 48 in the first embodiment.

An annular plate part 96, which expands in the radial direction, of the covering cover 94 has a planar shape substantially corresponding to the axial end surface of the rubber elastic body 76. Further, a cylindrical part 98 which expands in the axial direction is integrally formed with the covering cover 94 to protrude inward in the axial direction from the outer peripheral edge of the annular plate part 96. The axial length of the cylindrical part 98 is substantially equal to the axial length from the axial end of the central rod part 80 of the inner member 72 to the axial end of the outer member 74 (that is, ½ of the axial dimensional difference between the central rod part 80 and the outer member 74).

Furthermore, an annular fixing frame 100 is fixed to the covering cover 94 at the inner peripheral end of the annular plate part 96 having a shape substantially corresponding to the outer peripheral surface of the central rod part 80 of the inner member 72. The fixing frame 100 is made of a hard material such as metal, and the inner peripheral surface of the center hole 102 of the fixing frame 100 has a shape substantially corresponding to the outer peripheral surface of the inner shaft end 82 of the inner member 72.

Then, the fixing frame 100 is fitted onto the shaft end 82 of the inner member 72, and is fixed to the inner member 72 by press fitting or adhesion in a positioned state in contact with the step 86, so that the covering cover 94 is fixedly assembled to the bushing body 93.

The covering cover 94 may not be in contact with the rubber elastic body 76 or the outer member 74 but may come into contact with the rubber elastic body 76 or the outer member 74 at the time of load input, or may be in contact with the bushing in the single item state from the beginning. Particularly, the covering cover 94 is made of an elastic material, and in the present embodiment, the covering cover 94 is thin and easily deformable. Therefore, the contact of the covering cover 94 with the rubber elastic body 76 or the outer member 74 has almost no adverse effect on the dynamic properties of the rubber bushing 70 for monolink.

Particularly, the covering cover 94 of the present embodiment has a substantially L-shaped cross-sectional shape, and is assembled in a state of facing the axial exposed surface 92 of the rubber elastic body 76, which is formed with a concave groove-shaped cross-sectional shape that opens outward in the axial direction, with a sufficient gap 103 in the axial direction.

The rubber bushing 70 for monolink of the present embodiment which has the above-mentioned structure is used for a monolink type axle box support device for connecting a wheel set to a truck frame in a truck for railroad vehicle.

Figure 12:
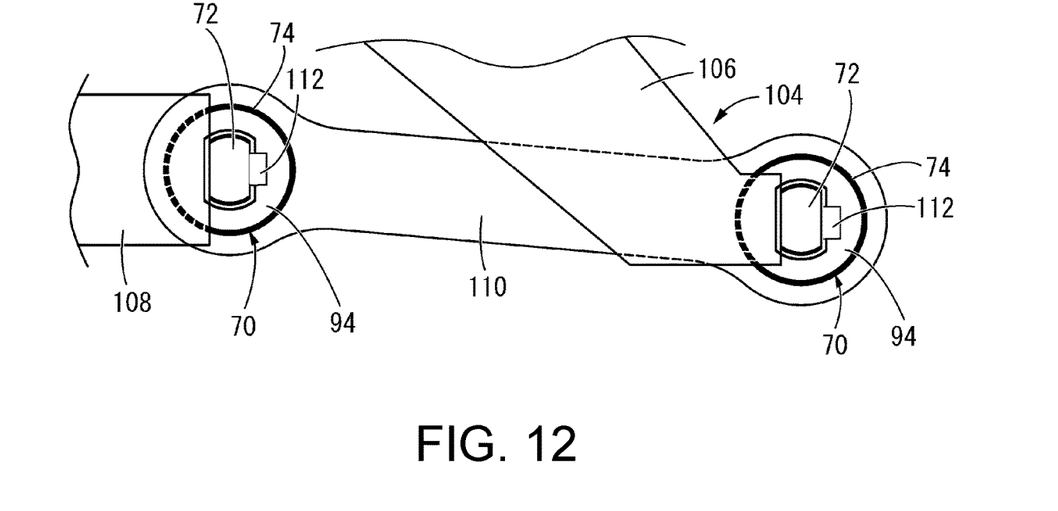
FIG. 12 is an explanatory view showing a state in which the rubber bushing for axle box support device shown in FIG. 8 is mounted on the truck for railroad vehicle.

Generally, as illustrated as a model in FIG. 12, the monolink type axle box support device 104 includes the axle box 108 that is movably cushioned and supported in the vertical direction of the vehicle by a coil spring with respect to the truck frame 106 for rotatably supporting the axle of the wheel set, and the axle box 108 and the truck frame 106 are connected by a monolink 110 that extends in the longitudinal direction of the vehicle. Then, the rubber bushing 70 for monolink is mounted on each attached portion of the axle box 108 and the truck frame 106 at both axial ends of the monolink 110, and both axial ends of the monolink 110 are connected to the axle box 108 and the truck frame 106 in a cushioned manner.

More specifically, an arm eye (mounting hole) penetrating in the lateral direction of the vehicle is formed at the axial end of the monolink 110, and the outer member 74 of the rubber bushing 70 for monolink is press-fitted and fixed to the arm eye. In contrast, the inner member 72 of the rubber bushing 70 for monolink is fixed and attached to the axle box 108 or the truck frame 106 by a fixture 112 such as a bolt inserted into the through holes 84 formed in the inner shaft ends 82.

Under such a mounted state, the rubber bushing 70 for monolink is positioned below the truck frame 106, and the axial exposed surfaces 92 of the rubber elastic body 76 that are not covered by the inner member 72 and the outer member 74 are not covered and are exposed to the outside in the lateral direction of the vehicle.

Here, in the rubber bushing 70 for monolink of the present embodiment, the axial exposed surfaces 92 are covered with the covering covers 94 on both side portions of the bushing body 93 in the axial direction. Therefore, similar to the rubber bushing for axle beam of the first embodiment, for example, even if flames due to an external fire are spread to the rubber bushing 70 for monolink, it is possible to prevent the rubber elastic body 76 from being directly exposed to the flames. In addition, the same technical effects as the first embodiment can be effectively exhibited.

Although the embodiments of the disclosure have been described above with reference to specific examples, the disclosure should not be interpreted as being limited to the above specific description. For example, it is also possible to form a portion of the cover part that may be particularly exposed to high temperature with metal which has higher heat resistance than elastomer. Specifically, in the rubber bushing 70 for monolink of the second embodiment, it is also possible to form one of the annular plate part 96 and the cylindrical part 98 with metal, or to form the annular plate part 96 and the cylindrical part 98 partially with metal.

Furthermore, in the rubber bushing 10 for axle beam of the first embodiment, the inner peripheral portion of the cover ring 48 fitted into the groove-shaped outer peripheral exposed surface 44 can be partially formed in the circumferential direction to an extent that can position the cover ring 48 with respect to the bushing body 46.

In addition, the shape, material, etc. of the cover part adopted in the disclosure can be appropriately changed as required as long as the cover part achieves the heat resistance and flame resistance required for the rubber bushing for axle box support device in a railroad vehicle truck.

For example, in the bushing bodies 46 and 93, the cover part does not necessarily cover the entire surface of the exposed end surface exposed to the outside in the state where the bushing bodies 46 and 93 are mounted on the truck for railroad vehicle, and it is also possible to specify and set a surface of the exposed end surface to be covered with the cover part in consideration of the expected direction of the flames. Further, the entire cover part can be made of a hard material if the cover part has no interference or contact with other members under the expected vibration input conditions or if the cover part causes no problem. Moreover, in the second embodiment, the cover part is supported by the inner side member, but the cover part can also be supported by the outer side member, or be supported by the axle beam or the monolink, and it is not necessary to support the cover part with other members as long as the cover part can be held in the mounted state.

Furthermore, although the above embodiments illustrate examples of applying the disclosure to a rubber bushing for railroad truck to be used in a monolink type axle box support device and an axle beam type axle box support device, the application of the disclosure is not limited thereto. For example, the disclosure is also applicable to a rubber bushing used for a towing device of a bolsterless truck, a rubber bushing mounted on a portion connected to the bolster of a bolster anchor or the truck frame in a truck with a bolster, or rubber bushings used in various types of axle box support devices.

In addition, although not listed one by one, the disclosure can be implemented in aspects with various changes, modifications, improvements, etc. added based on the knowledge of those skilled in the art, and needless to say, all such aspects are included in the scope of the disclosure as long as these aspects do not deviate from the gist of the disclosure.

What is claimed is:

1. A rubber bushing for railroad truck used for a truck of a railroad vehicle, comprising:
    a shaft-shaped inner side member;
    an outer side member arranged apart from an outer peripheral side of the inner side member; and
    a rubber elastic body connecting the inner side member and the outer side member,
    wherein at an axial end of the rubber elastic body, a cover part that covers from outside an exposed end surface where the rubber elastic body is exposed to the outside between respective axial ends of the inner side member and the outer side member is provided as a separate member from the rubber elastic body,
    wherein
    the axial end of the rubber elastic body has a flange-shaped rubber part,
    the flange-shaped rubber part is sandwiched in an axial direction between the respective axial ends of the inner side member and the outer side member, and
    an outer peripheral surface of the flange-shaped rubber part is taken as the exposed end surface and is covered by the cover part;
    the outer peripheral surface of the flange-shaped rubber part has a substantially constant cross-sectional shape composed of a curved concave shape that opens on the outer peripheral surface, and has a groove shape extending over an entire circumference in a circumferential direction, and
    a shape of an inner peripheral side of the cover part has a substantially arcuate cross-sectional shape that is convex toward the inner peripheral side, substantially corresponding to the shape of the outer peripheral surface of the flange-shaped rubber part;
    a gap is provided between the exposed end surface of the rubber elastic body and the cover part,
    wherein the gap disposed between a bottom of the outer peripheral surface and the cover part is continuously set over an entire circumference in the circumferential direction, or is partially set in the circumferential direction.

2. The rubber bushing for railroad truck according to claim 1, wherein the cover part is in contact with the exposed end surface of the rubber elastic body in at least a part.

3. The rubber bushing for railroad truck according to claim 1, wherein at least a part of the cover part is made of an elastomer.

4. The rubber bushing for railroad truck according to claim 3, wherein the cover part is positioned at a position to cover the exposed end surface of the rubber elastic body from outside by utilizing elasticity of the elastomer.

5. The rubber bushing for railroad truck according to claim 1, wherein in a state of being mounted on the truck of the railroad vehicle, the exposed end surface of the rubber elastic body is covered by the cover part in a state where the exposed end surface is not directly visible from outside from any direction.

6. A rubber bushing for railroad truck used for a truck of a railroad vehicle, comprising:
    a shaft-shaped inner side member;
    an outer side member arranged apart from an outer peripheral side of the inner side member; and
    a rubber elastic body connecting the inner side member and the outer side member,
    wherein at an axial end of the rubber elastic body, a cover part that covers from outside an exposed end surface where the rubber elastic body is exposed to the outside between respective axial ends of the inner side member and the outer side member is provided as a separate member from the rubber elastic body,
    wherein the cover part is an annular elastic body that is capable of being expanded in a diameter and deformed, and
    the cover part is mounted to be fitted into the exposed end surface, which is a groove-shaped outer peripheral exposed surface, with the diameter expanded.

7. A rubber bushing for railroad truck used for a truck of a railroad vehicle, comprising:
    a shaft-shaped inner side member;
    an outer side member arranged apart from an outer peripheral side of the inner side member; and
    a rubber elastic body connecting the inner side member and the outer side member,
    wherein at an axial end of the rubber elastic body, a cover part that covers from outside an exposed end surface where the rubber elastic body is exposed to the outside between respective axial ends of the inner side member and the outer side member is provided as a separate member from the rubber elastic body,
    wherein the cover part is an annular elastic body that is capable of being expanded in a diameter and deformed, and
    the cover part is mounted to be fitted into the exposed end surface, which is a groove-shaped outer peripheral exposed surface, with the diameter expanded,
    wherein a cross-sectional shape of the cover part is a tapered surface in which one surface in an axial direction of the rubber bushing is inclined, and
    based on an elasticity of the cover part in a reduced diameter direction under a mounted state, the tapered surface comes into contact with an inner flange-shaped part of the inner side member so that the other surface in the axial direction is pressed against an outer flange-shaped part of the outer side member.

* * * * *